United States Patent
Liu et al.

(10) Patent No.: US 8,768,323 B2
(45) Date of Patent: Jul. 1, 2014

(54) SERVICE DISCOVERY IN A WIRELESS NETWORK

(75) Inventors: Huaiyu Liu, Portland, OR (US);
Michelle X. Gong, Sunnyvale, CA (US);
Marc Meylemans, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 12/489,719

(22) Filed: Jun. 23, 2009

(65) Prior Publication Data

US 2010/0322213 A1 Dec. 23, 2010

(51) Int. Cl.
*H04M 3/00* (2006.01)

(52) U.S. Cl.
USPC ........ 455/418; 370/338; 455/407; 455/414.1; 455/432.3; 455/435.1

(58) Field of Classification Search
USPC ............... 455/41.2, 414.1, 418, 435.1, 432.3, 455/507; 370/311, 338, 352, 401, 411, 465, 370/468

See application file for complete search history.

(56) References Cited

U.S. PATENT DOCUMENTS

| | | | |
|---|---|---|---|
| 2003/0006911 A1* | 1/2003 | Smith et al. | 340/988 |
| 2004/0199616 A1* | 10/2004 | Karhu | 709/221 |
| 2008/0188180 A1* | 8/2008 | Rahja | 455/41.2 |
| 2009/0175207 A1* | 7/2009 | Stephenson et al. | 370/311 |
| 2009/0240582 A1* | 9/2009 | Sheldon-Neal et al. | 705/14 |

* cited by examiner

*Primary Examiner* — Dinh P Nguyen
(74) *Attorney, Agent, or Firm* — Kacvinsky Daisak Bluni PLLC

(57) ABSTRACT

Embodiments of service discovery in a wireless network involve an Access Point (AP) proxy service to represent service providers. The AP manages service provider information, which is provided in response to service requests from service consumers. The AP proxy capability is advertised as a broadcast message in the wireless network.

18 Claims, 10 Drawing Sheets

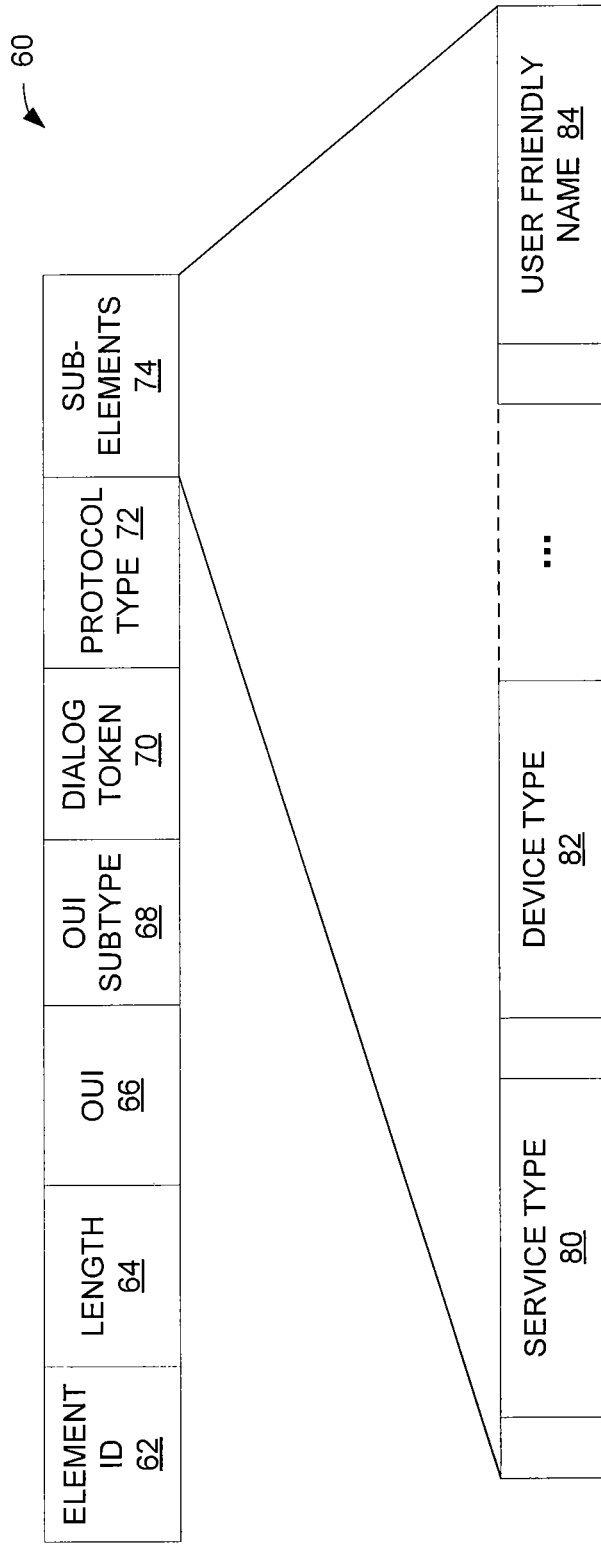

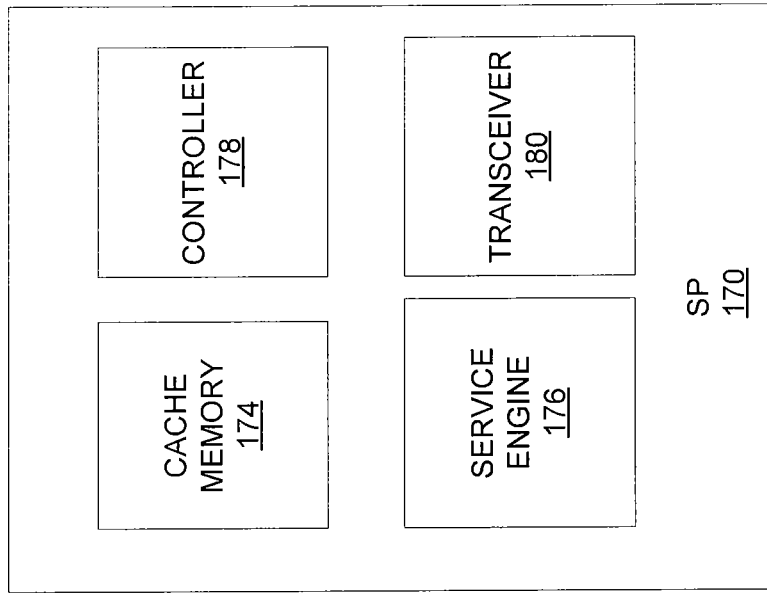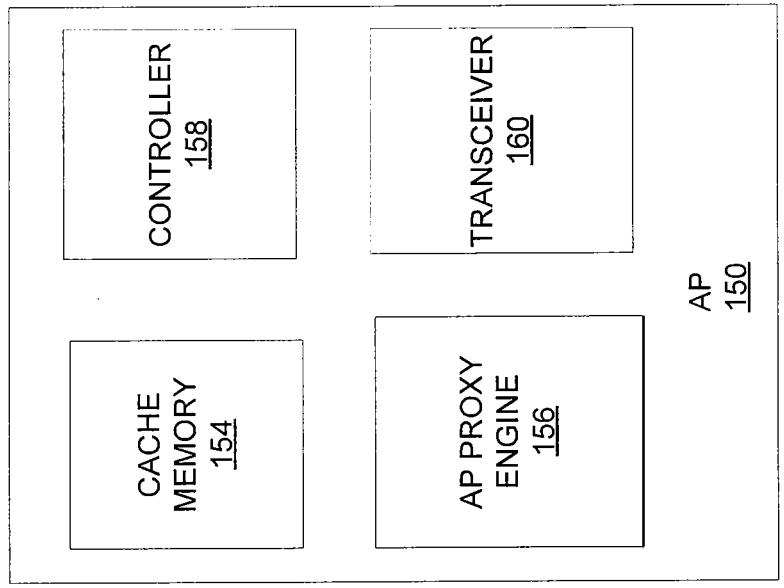
FIG. 6

SERVICE DISCOVERY IN A WIRELESS NETWORK

TECHNICAL FIELD

Some embodiments pertain to wireless communications. Some embodiments pertain to the discovery of components in a wireless network.

BACKGROUND

The diversity of computing and communication applications increases as the size of the enabling devices decreases. Efficiency is a key design element for small devices. A mobile device, which is used by a Subscriber Consumer (SC), provides a good user experience when the device is able to quickly discover service(s) proximate to the device. Additionally, the device seeks to reduce power consumption for the mobile device as well as apparatus and machines at the Service Provider (SP).

BRIEF DESCRIPTION OF THE DRAWINGS

FIG. 4 is a block diagram illustrating a Type-Length-Value (TLV) frame for use in a communication protocol.

FIG. 5 is a block diagram illustrating a service registration Information Element (IE) of a message frame, in accordance with example embodiments.

FIG. 6 is a block diagram illustrating an AP and an SP within a communication system, in accordance with example embodiments.

DETAILED DESCRIPTION

Figure 1:
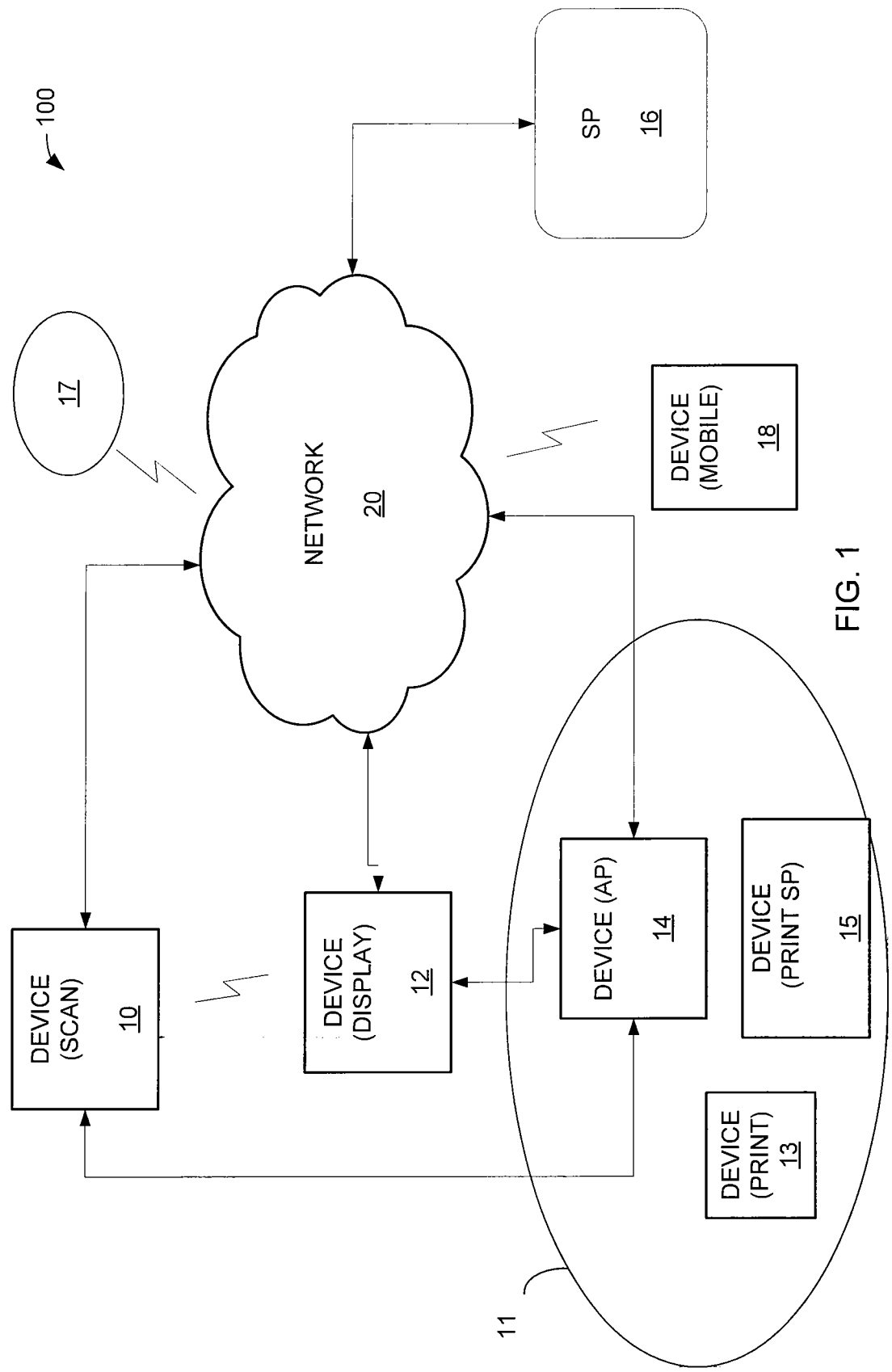
FIG. 1 illustrates a wireless communication network, supporting Point-to-Point (P2P) communications and having multiple devices supporting P2P communication, in accordance with example embodiments.

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

As mobile computing and communication devices continue toward smaller device sizes, the function and capabilities of these devices increases. Devices communicate wirelessly with a variety of other devices and networks. New applications introduce demands on service discovery and energy efficiency. Service discovery may be done through higher-layer service discovery protocols, such as Universal Plug and Play (UPnP) which is a set of networking protocols to allow devices to connect seamlessly. Another higher-layer service discovery protocol is applied for Zero Configuration Network (ZeroConf), which is a set of techniques to create a usable Internet Protocol (IP) network. Some service discovery techniques result in long delays, requiring establishment of a connection with the network or other devices before initiating discover services. For example, in a system having multiple networks or multiple peer devices, each device connects and disconnects from the multiple networks and/or multiple peer devices in order to locate a network or a peer device which is able to support a specific service.

A Communication System

A communication system may include both wired and wireless components. The system may include networks, such as Local Area Networks (LANs) and may interact with Wide Area Networks (WANs). Within a communication system, groups of devices may be arranged for simplified communication, such as a group of devices communicating with each other and having access to devices external to the group through a common node or device. A variety of configurations and arrangements are possible to allow efficient communication over a variety of communication media.

A convenient model for describing a communication system employs the Open Systems Interconnection (OSI) reference model. The OSI model is particularly useful in understanding the layers, including the higher layers, of a communication system. The OSI model, developed by International Organization for Standardization (ISO) in 1984, is a conceptual framework or architectural model of standards for communication in the network across different equipment and applications by different vendors. The OSI model defines the communications process into seven (7) layers. Layers 7 through 4 deal with end to end communications between data source and destinations. Layers 3 to 1 deal with communications between network devices. The higher layers or upper layers include layers 7, 6 and 5, while the lower layers include layers 4, 3, 2, and 1. The upper layers of the OSI model deal with application issues and generally are implemented in software. The highest layer, the application layer, is closest to the end user. The lower layers of the OSI model handle data transport issues. The physical layer and the data link layer may be implemented in hardware and software. The lowest layer, the physical layer, is closest to the physical network medium (the wires, for example) and is responsible for placing data on the medium. A specific description of the OSI layers is given in Table I. Some methods provide discovery in the layer 2, or Data Link Layer, which is referred to as Layer-2 Service Discovery (L2SD).

TABLE I

OSI Layers

| Layer | Description |
|---|---|
| 7 | Application Layer: Defines the interface to user processes for communication and data transfer in the network. |
| 6 | Presentation Layer: Masks the differences of data formats between dissimilar systems. Specifies architecture-independent data transfer format. Encodes and decodes data. Encrypts and decrypts data. Compresses and decompresses data. |
| 5 | Session Layer: Manages user sessions and dialogues. Controls establishment and termination of logic links between users. Reports upper layer errors. |
| 4 | Transport Layer: Manages end-to-end message delivery in network. Provides reliable and sequential packet delivery through error recovery and flow control mechanisms. Provides connectionless-oriented packet delivery. |
| 3 | Network Layer: Determines how data are transferred between network devices. Routes packets according to unique network device addresses. Provides flow and congestion control to prevent network resource depletion. |
| 2 | Data Link Layer: Defines procedures for operating the communication links. Frames packets. Detects and corrects packets transmit errors. |
| 1 | Physical Layer: Defines physical means of sending data over network devices. Interfaces between network medium and devices. Defines optical, electrical and mechanical characteristics. |

Some communication systems may be organized according to another model. The present disclosure considers the OSI model as an example for clarity of discussion, but the concepts described are not limited to such a model.

Discovery in a Wireless Network

Within a communication system, such as a system including a wireless network, the individual devices and groups of devices may attempt to identify services provided within the network. A device may send a request to discover the other devices and services available within the network.

According to an example embodiment, efficient service discovery enables devices within a communication system to discover proximate services efficiently, without incurring unacceptable power consumption for the device or service providers. Service provider may employ a variety of techniques; these techniques often involve communication and messaging between entities in a system. For example, individual devices may coordinate to determine service capabilities. Similarly, a device may advertise service capabilities to multiple devices in a network. Efficient service discovery uses a system's configuration and capabilities to assist in the discovery process and reduce the communications and messaging.

A communication system is made up of multiple nodes or points for implementing communication paths among multiple devices. A variety of configurations of such a communication system may include many different types of connections. Each device within a communication network may be considered a node or point of the network. A communication system may also include a common node providing connectivity and enabling communication paths to multiple devices; this type of common node is referred to as an Access Points (AP). As used herein, an AP refers to a device that provides connectivity for at least one other device. The AP provides connectivity within a communication system, which may include a network of connectivity, such as communication through the Internet or other networked environment. In one example, an AP provides connectivity to a network for a group of devices. The network may support one or multiple communication protocols. For example, the network may support Wi-Fi connectivity to Wi-Fi stations as specified in by IEEE 802.11, which is a set of standards for implementing communications in a Wireless Local Area Network (WLAN). A network or system may support other communication protocols as well.

In a communication system, the multiple devices may offer different services or capabilities. Similarly, a group of devices may offer a composite service, such as where the group includes a server for coordinating operations and individual computing devices. As used herein, "device" and "computing device" are not meant to refer strictly to a stand-alone machine, but may refer to modules, circuitry, software, hardware, firmware, or other machines within one device. For communication within a communication system or network, a device desiring to use a service requires a way to access the service. In one example, a device may request information about the capabilities available in the system or from a specific device, or may receive information as broadcast from within the system. These processes are generally referred to as service discovery.

For service discovery, a device discovers information about other devices, and then uses that information to access a desired service. A type of system configuration which allows devices to interact directly includes a Point-to-Point (P2P) communication system. P2P refers to the ability of an individual device to communicate with another individual device, directly or through the network. P2P also refers to the ability of a group of devices to communicate with another device or another group. In a P2P system, service discovery includes device discovery, which finds at least one of the P2P devices in the network, and then selects from the discovered P2P devices for communication or to access a service. In one example, P2P devices include a laptop computer and multiple printers; the laptop computer discovers the printers and then selects one of the printers for printing a document.

P2P service or device discovery may include multiple phases, such as a scan phase and a find phase. The scan phase is defined by specifics for scanning the network to identify other P2P devices. The scan phase allows a first device to find other devices or groups of devices in the network, as well as to locate an operating frequency channel. A channel may be a portion of the transmission spectrum. In a Wi-Fi system, the channel is a range of frequencies. In one example, a Wi-Fi system may have a channel defined by a low frequency, central frequency and high frequency, such as 2.401 GHz, 2.412 GHz, and 2.423 GHz, respectively. In one example, a scan phase provides information regarding other devices or networks and network elements by scanning multiple channels.

In some examples, service discovery introduces delay as a communication connection is established before or prior to service or device discovery. This may require multiple connections, disconnections, identification processes, and so forth, in order to locate the point for a particular service. While various discovery methods avoid some delay in the discovery process, residual delays remain, such as the time for waking a device that is in power save mode.

The following discussion describes a wireless network for wireless communication, such as a wireless Local Area Network (LAN), implementing a WiFi communication protocol as specified by IEEE 802.11. The following nomenclature is consistent with this embodiment; however, the methods and apparatus described herein are also applicable to other types of communication networks. A wireless LAN is a network of APs, wherein an AP may be an infrastructure AP or a Central Point (CP) in a wireless Peripheral Access Network (PAN). For example, for a wireless docking implementation, a display having wireless communication capability may act as a CP, allowing connection for other peripheral devices. There are a variety of different devices and different combinations available for wireless communication networks. The following discussion is provided with respect to a given network; however, the methods described are not limited to the example networks and devices described herein.

FIG. 1 illustrates a system 100, supporting wireless and P2P communications. The system 100 includes multiple devices supporting P2P communication, including device 10, device 12, device 14, device 18, and group 17. As illustrated, device 14 is part of a group 11, which includes other devices: device 13 and device 15, and will be described further herein below. In the present example, device 10 is a scan device, device 12 is a display device, and device 13 is a print device. The system 100 supports a WiFi communication protocol. The system 100 may also include wired connections to other devices (not shown), and may support or implement other communication protocols as well. The system 100 includes a network 20, which may be the Internet or other networked system.

The system 100 communicates with a group of other devices 17, which may include a server or other computing device (not shown) which provides a gateway to network 20 for other devices 17. The other devices 17 may communicate with network 20 and other devices within system 100 using wireless or wired communication methods. The connections within system 100 illustrate various communication paths, but the system 100 is not limited to the communication paths illustrated, and devices within system 100 may communicate using wired or wireless communication techniques.

Still further, system 100 includes a device 18 which is a mobile device for communication with network 20 as well as other P2P devices within system 100. The device 18 may include additional functionality, such as applications for providing services to other devices within system 100. Similarly, when device 18 moves within a group of devices, such as the group of other devices 17, device 18 may join that group.

AP Proxy in a Wireless Network

While service discovery often involves communication messages and negotiation, such as among P2P devices, efficient service discovery may be implemented according to an example embodiment using aspects of a system configuration, such as the configuration of system 100. As illustrated, system 100 includes multiple devices, wherein the device 14 acts as an AP for other devices. As an AP provides connectivity and a communication path to other devices in the system 100, the AP may be implemented as a proxy for devices in service discovery processes. In this way, the individual devices may remain in a power saving mode while the AP provides information and responds to information requests. For example, device 14 may act as an AP proxy for device 13 and device 15.

An AP, such as device 14, may be a router or other device providing connectivity to a network, such as network 20. The devices connected to device 14 communicate with the network 20 through the AP. Similarly, devices communicating through the network 20 go through device 14 to communicate with device 13 and device 15. In this way, device 14 is on the communication paths involving device 13 or device 15. Devices may access services offered by device 13 or device 15 through device 14.

According to one embodiment, an AP proxy scheme enables an AP to advertise the services and devices of a network. In one example, device 14 acts as an AP for group 11; group 11 includes devices 13, 14 and 15. Note, other devices may act as an AP for wireless connections to other devices or to network 20. Still further, devices 17 may include an AP, as well as SP 16, device 18, and so forth. A device within system 100 may act as an AP or may include an AP device, such as a home network router, or a module within a computing device. Such methods reduce latency and delay in the discovery process, while also allowing discovery of a Service Providers (SPs) while remain in a low power mode, such as a power save mode. The reduced time for service and device discovery reduces power consumption for the device seeking to discover services and devices available in the network as well.

According to an example embodiment, device 14 is an AP providing wireless connectivity to network 20 for device 13 and device 15 within group 11. At least one device within group 11 provides services to other devices; the services may be offered to devices within group 11 and to devices external to group 11.

In one example, device 15 provides a printing service and, therefore, acts as an SP for these services. For device 15, and other SPs, to provide their services to other devices, the SP makes information available identifying the service and how to access the service to other devices. In some service discovery techniques, the SP provides this information individually on request by the other device. In other techniques, the SP broadcasts or advertises the information to multiple devices, such as throughout system 100 or within network 20. According to some example embodiment, AP proxy service discovery techniques reduce the burden on individual SPs by providing the service and access information to an AP. The AP is then able to act as a proxy for the SP in maintaining the SP service and access information as well as providing the SP service and access information, such as through an advertisement or in response to service discovery requests. In this way, the AP may compile information for multiple SPs to advertise multiple services. The AP alleviates the need for individual SPs to respond to service discovery requests or to broadcast information, and thus increases the efficiency of SP devices. The SP may enter a power saving mode, such as a sleep mode, and may choose not to respond to service discovery requests.

SP Registration with an AP Proxy

Figure 2:
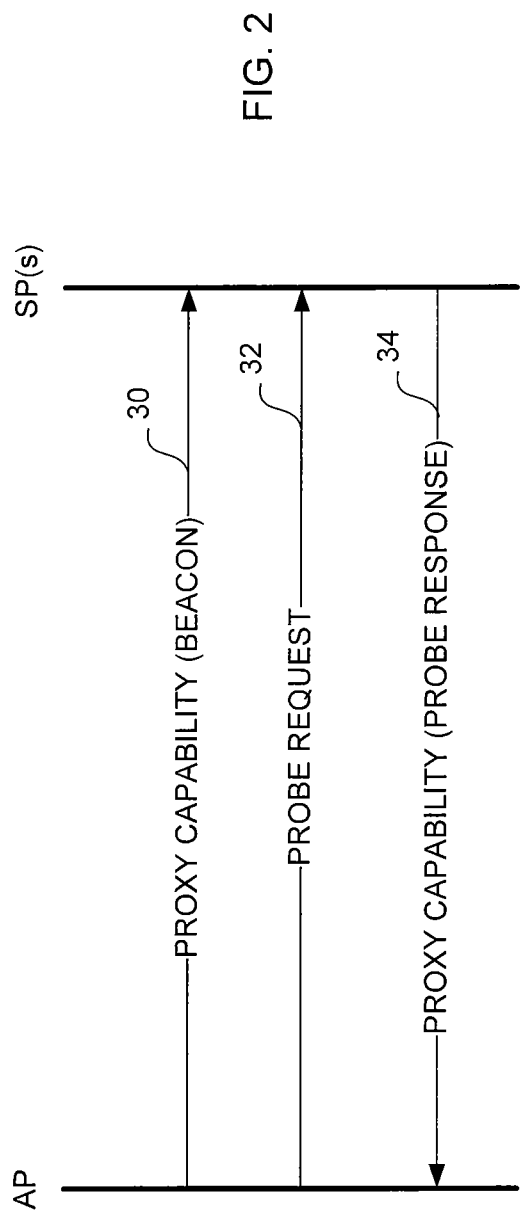
FIG. 2 is a signal flow diagram illustrating an Access Point (AP) providing proxy capability information to Service Providers (SPs) in a communication system, in accordance with example embodiments.

In one embodiment, an AP sends out information to the network 20 periodically or on occurrence of an event. In other embodiments, the AP may send out information according to a schedule or randomly. FIG. 2 illustrates a signal flow diagram for an Access Point (AP) providing proxy capability information to Service Providers (SPs) in a communication system, in accordance with example embodiments. The AP, such as device 14 of FIG. 1, provides a proxy capability message 30, such as a beacon transmission, which may be provided wirelessly throughout system 100. To access further information, the SP, such as device 15, then sends a probe request 32 to the AP. The AP responds with a proxy capability message 34 including, or as, a probe response. The proxy capability message 30 is part of a proxy capability advertisement, which is provided in layer 2 of the OSI model described herein above. A given SP may receive advertisements similar to proxy capability message 30 from other APs within system 100.

To enable an AP proxy service discovery technique, the SP then provides service and access information to the AP. The AP maintains such information, as well as information for other SPs. The information may then be sent out in a beacon as an advertisement to notify other devices within system 100 that the services are available, as well as to provide access information to the SP(s). When an SP seeks to use an AP as a proxy, or seeks to join a network or group, the SP sends an Association Request or a Reassociation Request that contains its service information to the AP. For example, in system 100, for device 15 to use device 14 as an AP, device 15 sends a registration request to device 14 in the network 20, such as by sending a Reassociation Request message including service information for device 14. The services provided by device 15 are considered to be registered with the AP, i.e., with device 14, after device 15 receives a Reassociation Response frame.

In a Wi-Fi system, an association is a process specified by the IEEE 802.11 standard for a mobile device to connect to an AP. An SP associates with an AP so the AP has information about the SP and the SP is able to advertise its services through the AP. The association process may occur before or after the SP discovers that the AP supports an AP proxy process. After association, an SP may then register with an AP, which is part of the AP proxy process. The association and registration processes are implemented in different layer 2 messages.

Such a proxy capability advertisement may be referred to as an L2SD proxy capability advertisement. The AP advertises the capability in a message or beacon. In one embodiment, an L2SD proxy capability bit is provided within an Information Element (IE) in a Wi-Fi communication system. As specified in the IEEE 802.11 WLAN protocol, an IE is part of a management frame. The IEs provide a way for a device to transfer descriptive information about the device inside management frames. A management frame may include several IEs. Other communications within system 100 are provided as IEs, including SP messages to establish registration with an AP and to provide service and access information.

Figure 3:
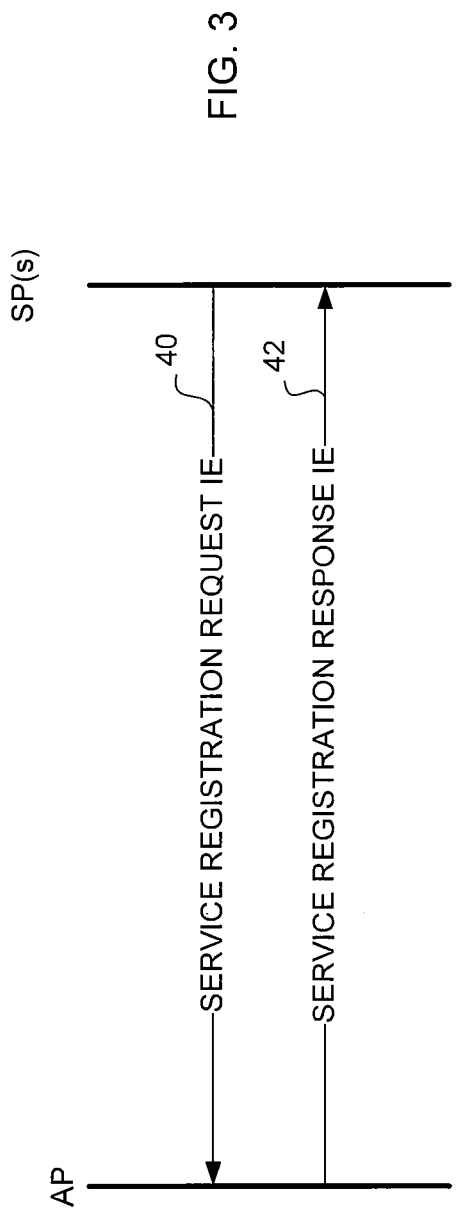
FIG. 3 is a signal flow diagram illustrating a service registration process for an SP, in accordance with example embodiments.

FIG. 3 is a signal flow diagram illustrating a service registration process for an SP, in accordance with example embodiments. An SP desiring to use an AP as a proxy sends a service registration request 40 to the AP as an IE, including information identifying the SP and requesting registration. The SP includes information in the IE to identify the services offered by the SP and corresponding service attributes. This information is carried in a sub-element of the IE, as described herein below. Service information may be used by a device seeking such services, such as an SC, in deciding to select this SP. For example, when device 18 of FIG. 1 is a mobile device acting as an SC seeking a printing service, device 18 may use a service discovery process to find device 15 as an SP; the device 18 may consider attributes of device 15 in comparison to other printing devices. The device 18 may desire a color printer to print a document, and therefore, the ability to print in color is an attribute of interest to the device 18 as an SC. The information identifying attributes of the SP, such as device 15, are encoded in the sub-elements of the IE sent to the AP, such as device 14. The IE further includes service type, context or location of the SP, and may include a user-friendly name. In one example, the SP information may be derived from service information provided by higher-level service applications. In some embodiments, some information may be configured by user input to the SP.

The AP considers the service registration request 40 and determines if there is capacity to provide the proxy service for the requesting SP. The AP responds with a service registration response 42 including an IE confirming or rejecting the request, and including other information used by the SP. The message formats described are examples of formats applicable for use in advertising and registering AP proxy capabilities. Other formats are also applicable to provide information between the AP and other devices in the system 100.

The various messages provided as IEs may be built according to a Type-Length-Value (TLV) format, which is used in other data communication protocols as well. Information may be encoded as an IE element in the protocol defining these as fixed-size fields or variable-size fields. FIG. 4 is a block diagram illustrating a Type-Length-Value (TLV) frame 50 for use in a communication protocol, including type field 52, length field 54 and value field 56, each of which are IEs according to an example embodiment. The type field 52 is a numeric code indicating the kind of field that this part of the message represents. The length field 54 provides the size of the value field 56; the size may be provided in bytes of data. The value field 56 contains the data portion of the message. While other mechanisms may be implemented for providing information in the IE, such TLV sequences are easily searched using generalized parsing functions when employed in an easy to read format, such as in a binary format, and allow easy extraction of new portions of a message.

FIG. 5 is a block diagram illustrating a service registration Information Element (IE) of a message frame 60, in accordance with example embodiment. The message frame 60 includes several IEs in a TLV format. As illustrated, message frame 60 includes an element ID field 62 to identify an IE, such as where the IE is vendor-specific, and a length field 64 identifying a size of the data provided in the message frame 60. The message frame 60 also includes an Organizationally Unique Identifier (OUI) field 66, which stores a number for registration with a registration authority, such as the IEEE. The identifier may identify a vendor or other organization associated with an equipment vendor or organization.

Continuing with FIG. 5, the message frame 60 also includes a dialog token field 70, where the dialog token is a sequence number generated for a request-response pair. As discussed hereinabove, the attributes are specific to the service offered by the SP, the attributes of the service offered by the SP as well as the location of the SP within system 100. For example, the device 18 may not be interested in printing services from device 15 if device 15 is inconveniently located. Still further, message frame 60 includes a protocol type field 72 and sub-elements field 74. The protocol type field 72 may identify a communication protocol used to access and provide the service(s) of the SP. The sub-element field 74 identifies the attributes of the SP service, and, in one embodiment, is provided as encoded information. As illustrated in FIG. 5, the sub-elements field 74 includes various other fields including a service type field 80, a device type field 82 and a user friendly name field 84. The sub-elements field 74 may include any number of fields to store sub-elements. The form of the information stored in the fields within the sub-elements field 74 may be encoded according to a specified format. In one embodiment, the sub-element information identifies a location within system 100 where more specific information is found. A variety of methods may be used to convey the service and access information to an AP or an SC.

Using the methods described, an AP receives the information from the SP and stores such information. FIG. 6 is a block diagram illustrating an AP 150 and an SP 170 within a communication system, in accordance with example embodiments. The SP 170 may associate with the AP 150 according to a message exchange illustrated in FIG. 7, as discussed herein below. When the AP 150 receives information from the SP 170, such as in a message frame 60 of FIG. 5, the AP 150 stores the received information in a cache memory 154. The cache memory 154 may be within the AP 150, or may be an external memory device. As illustrated, the AP 150 further includes a transceiver 160 for wireless communication, such as Wi-Fi communications, a controller 158 for implementing operations within AP 150, and an AP proxy engine 156 to provide functions enabling the AP 150 to act as a proxy for SPs in service discovery. The cache memory 154 stores service and access information for those SPs having registered with AP 150. Further, the AP 150 may store information enabling network connectivity and communications for multiple devices.

In the example of FIG. 6, the SP 170 includes a controller 178, a cache memory 174, a service engine 176 and a transceiver 180. The controller 178 implements operations within SP 170 and may control interactions with the service engine 176. The service engine 176 enables the functions of service(s) offered by and performed by SP 170. The transceiver 180 enables wireless communication, such as Wi-Fi communications. The AP 150 and the SP 170 may each include other modules and may have capabilities in addition to those illustrated in FIG. 6.

When the AP 150 receives information from SP 170, the AP 150 determines if there is capacity in the cache memory 154 to store the information and if there is capability for AP proxy engine 156 to support the AP proxy requested by SP 170. The AP 150 may provide the AP proxy capabilities for other devices and may deny a request from SP 170 when memory in the cache memory 154 is limited or unavailable. The AP 150 sends a service registration response IE 42 from transceiver 160. The transceiver 160 acts as a communication module for communicating within a wireless communication network, such as a network supporting Wi-Fi communications.

Figure 7:
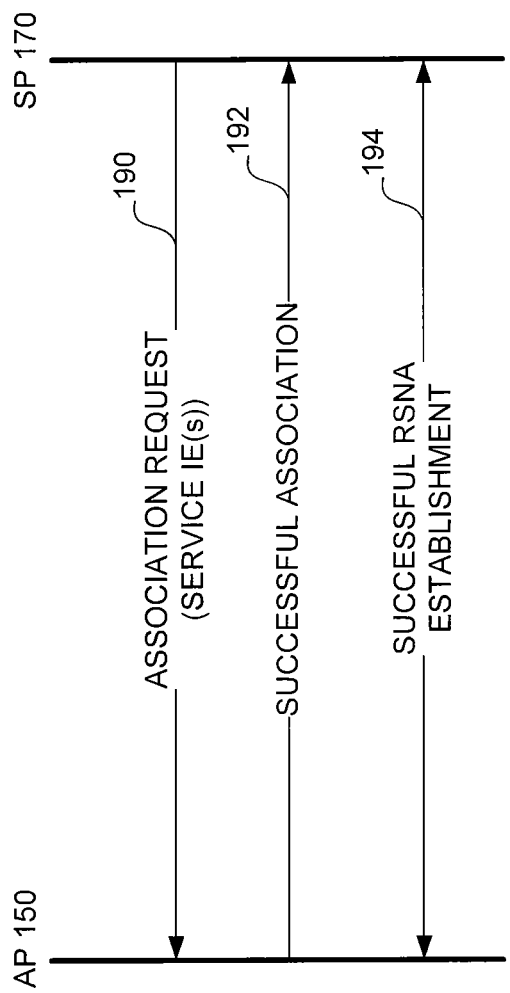
FIG. 7 is a signal flow diagram illustrating an association of an AP and an SP, in accordance with an example embodiment.

FIG. 7 illustrates an association between AP 150 and SP 170 in a signal flow diagram, in accordance with an example embodiment. In one embodiment a P2P device registers services and capabilities with another P2P device by sending an Association Request (AR) including service IEs. In response, the devices negotiate a Successful Association (SA). The SP 170 sends an association request 190 including service IE(s) to identify the SP 170 service(s). The AP 150 responds with a successful association message 192, which initiates establishment of a secure communication, and the resultant success message 194. In one example, as illustrated, the success message 194 identifies a security association, such as to establish a Robust Security Network Association (RSNA) security association, which defines a handshaking authentication or association process in a network supporting Wi-Fi communications.

Returning to the AP 150 and SP 170 of FIG. 6, the SP 170 may also de-register from the AP 150 to remove service records from cache memory 154. The SP 170 sends a service de-registration request IE with sub-elements as in the service registration request IE of FIG. 3. The AP 150 receives the service de-registration request IE and removes from cache memory 154 those contents specified in the sub-elements of the request. The AP 150 then replies with a service de-registration response IE to indicate that de-registration was successful or not.

Note, in some examples, the AP 150 may also remove the SP 170 service record, including the sub-elements provided to AP 150 from SP 170 during registration and association when a service timer expires. In one example, a Basic Service Set (BSS) specifies transition between APs as part of a security key negotiation protocol. Keys are renegotiated according to a time schedule. Where an indication is given that the keys or security has expired, the AP 150 may terminate the registration or the association. In such cases, the AP 150 acts proactively to protect secure communications. Similarly, the SP 170 may be a mobile device, such as device 18 of FIG. 1; where the SP 170 leaves the network 20 or system 100 but fails to provide a de-registration request, the AP 150 may remove the service record corresponding to SP 170 from the cache memory 154.

In the various communications for service registration, de-registration and AP association, message frames are provided between the SP and the AP. As illustrated in FIG. 5, the information exchanged between AP 150 and SP 170 may be provided in message frame 60, which may be a management frame or an action frame. In a Wi-Fi communication system, management frames enable devices, sometimes referred to as stations (STAs) to establish and maintain communications. Management frames include authentication frames to initiate or terminate secure communications with a device, association frames for an AP to allocate resources, beacon frames for an AP to broadcast its presence in the system, and probe frames to obtain and provide information to a device. The information may also be exchanged in action frames, which are used to request and satisfy an action.

Service Discovery Using an AP Proxy

According to some embodiments, service discovery using an AP proxy method includes implementing a proxy capability advertisement. In this way, the AP advertises that it is able to receive registrations from SPs within the system 100 as well as requests for service discovery. Accordingly, an AP which supports AP proxy function advertises the AP proxy capability to the network and to devices within system 100 of FIG. 1. A bit to identify the L2SD proxy capability may be included in a proxy capability message. Such information may be included in beacons as well as probe responses. SPs may discover the AP's proxy capability from beacons sent out periodically including the advertisement, or by actively scanning for the information, such as by sending a probe request.

Devices within the network are able to locate services, such as those offered by SP 16 or device 15, by sending a request to an AP, such as device 14, within the system 100. For a device, such as an SC, service discovery involves a scan and find procedure. During the scan phase one of multiple devices within system 100 searches for other devices. The scan phase is implemented when a device sends a probe request including information as designated by a specific protocol. The probe request may include a Service Set ID (SSID), which is a unique identifier that acts as a password for connection of a mobile device to a network. The SSID provides information to differentiate WLANs from each other. In this way, APs and other devices attempting to connect to a specific WLAN will use the same SSID.

Figure 8:
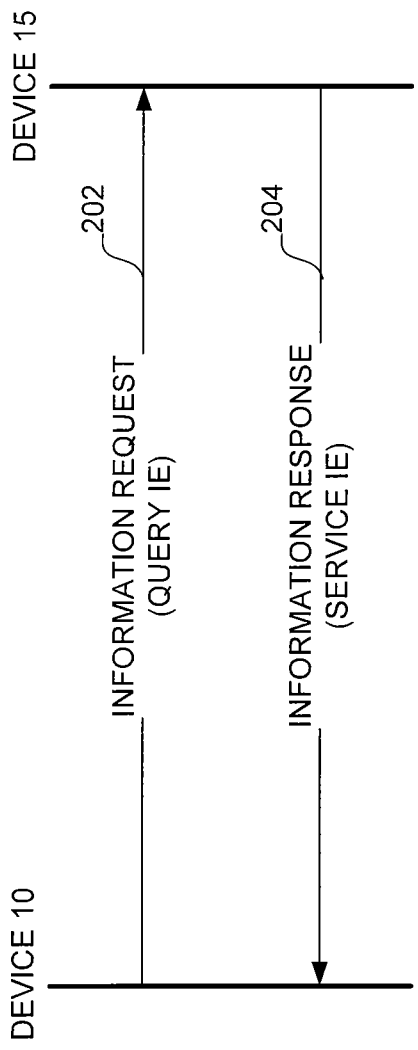
FIG. 8 is a signal flow diagram illustrating a scan phase in service discovery in a system, in accordance with some embodiments of the present invention.

FIG. 8 is a signal flow diagram illustrating a scan phase in service discovery in the system 100, in accordance with some embodiments of the present invention. In this case, the device 10 is scanning to identify components in the system 100 and sends an information request message 202, such as a probe request with a query IE, to device 12. In response, the device 12 responds with an information response message 204, such as a probe response, which includes a service IE providing information for the service offered by device 15, as well as access to the service. Service discovery is implemented when the device 10, acting as an SC, comes in the proximity of SP devices, such as device 15. The SC searches for available services by sending an information request message 202 or by including a query IE in a probe request. The query IE identifies a service the SC desires to find, and may include multiple query IEs if more than one service is desired. It is further possible for the SC to identify available services using a wildcard identifier, such as to send a query IE without specifying specific sub-elements.

Figure 9:
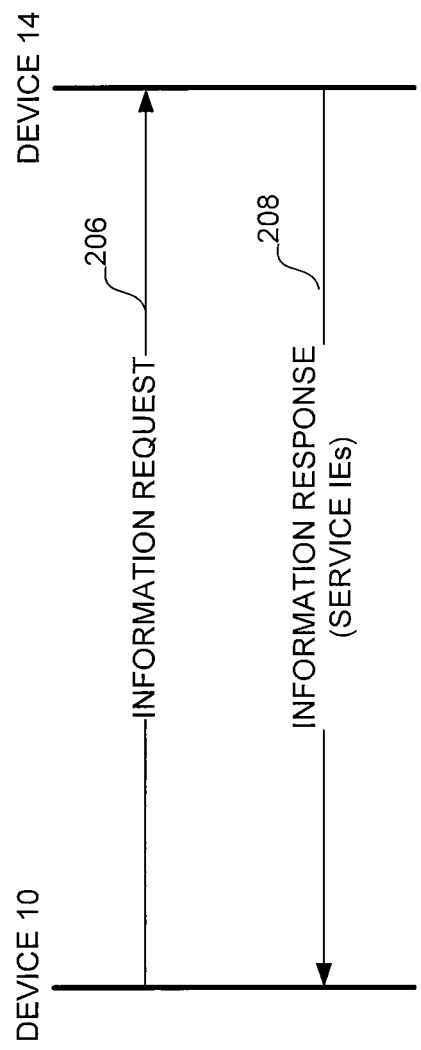
FIG. 9 is a signal flow diagram illustrating a scan phase in service discovery using an AP proxy service discovery, in accordance with some embodiments of the present invention.

FIG. 9 is a signal flow diagram illustrating a scan phase in service discovery using an AP proxy service discovery, in accordance with some embodiments of the present invention. During the scan phase, device 10 scans system 100 for P2P devices and sends an information request message 206 to device 14. In response, device 14 responds with an information response message 208, including multiple service IEs. In this case, device 14 acts as an AP and provides the service information relating to those SPs which have registered therewith. The AP may provide all of the services available or may provide a subset of the services available. In one example, the AP determines a loading balance for the SPs represented and implements a load balancing method to determine those SPs for which to provide information in response to a requesting SC.

According to some embodiments, when there is at least one SP in the AP's association to provide a requested service, the AP sends a probe response that includes the service IEs having sub-elements from the registered SP related to the requested service. For multiple SPs available to provide a requested service, several service IEs may be included in the probe response, where each service IE may include those sub-elements of the service registered by one such SP.

Figure 10:
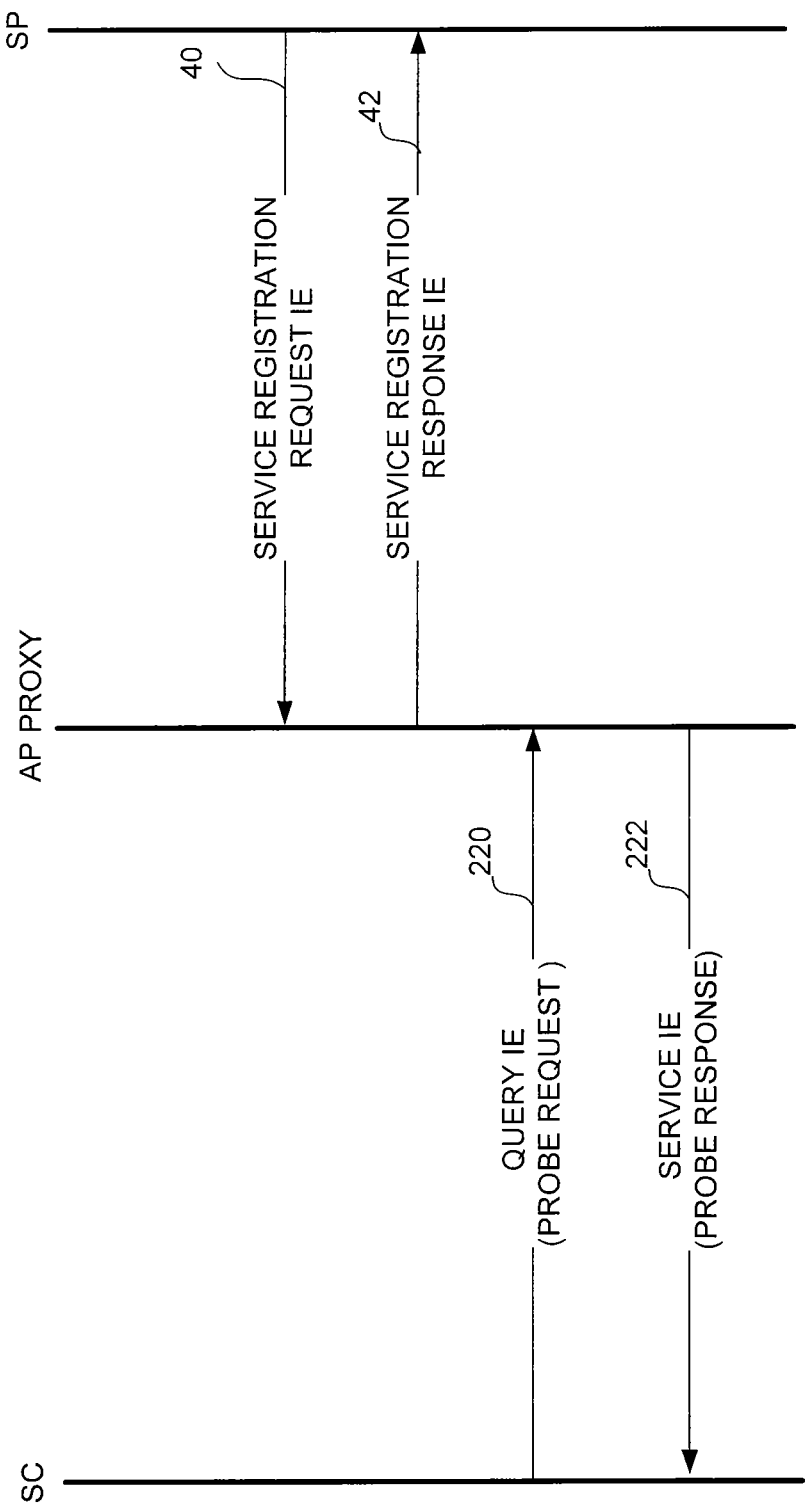
FIG. 10 is a signal flow diagram illustrating an AP proxy service discovery process, in accordance with example embodiments.

FIG. 10 is a signal flow diagram illustrating an AP proxy service discovery process, in accordance with example embodiments, illustrating the coordination of the AP as a proxy for SP(s) in communication with an SC. As illustrated, the SP has registered with the AP as in FIG. 3, by providing a service registration request IE 40 and receiving a service registration response IE 42. The AP has cached the service information for the SP, and then receives a query IE 220 from an SC. The query IE 220 may be a probe request provided by the SC. In response, the AP evaluates the information cached with respect to the various SP(s) and provides a service IE 222, which may be a probe response.

For example, when an SC includes service type information as:

"urn: schemas-upnp-org:service:PrintBasic:1"

within the query IE 220, requesting a printing service, the AP evaluates the service information to identify at least one SP that provides such a service. In this example, an SP had previously registered a printing service with the AP. The AP responds to the SC request by providing a service IE 222 including the same sub-elements as provided by the SP as part of the service registration request IE 40 and stored in cache memory (such as cache memory 154 of FIG. 6) of the AP.

The AP handles these requests as messages, such as in layer 2 of the OSI model, and therefore does not need to understand the services provided by the SP(s). The information contained in a message, such as service IE 222, is provided to the SC, which retrieves the information and understands the service indications. In some embodiments, the system may be designed such that AP does not support higher layer service discovery protocols, as the AP proxy functions are enabled in layer 2 communications. In such examples, the AP stores service information as specified in sub-elements in service registration. The AP then searches through the stored sub-elements over the various SP(s) in response to a query IE 220, and responds providing those sub-elements that match the query. Effectively, the AP merely collects data, such as the message frame fields, maintains the data as a service record corresponding to each SP, retrieves the information when requested, and provides the information to the requester.

In some examples, however, the AP may have knowledge of the specifics of the services, including service type, service attributes, context, SP location, and so forth, which may be used for load balancing or other considerations. A range of implementations are available consistent with a Wi-Fi communication system, and other type of communication systems, to use minimum functionality of the AP or to implement smart functionality by adding capabilities.

Figure 11:
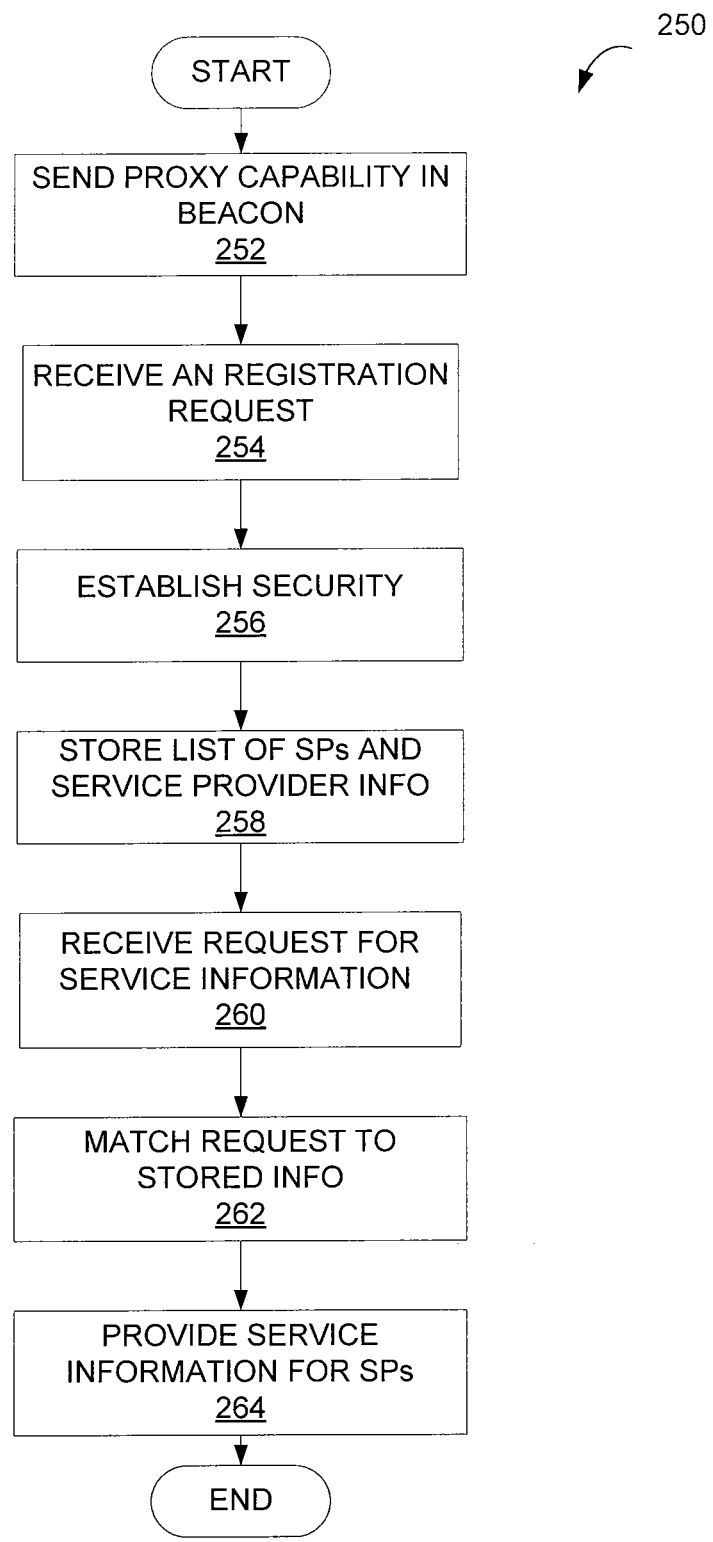
FIG. 11 is a flow diagram illustrating an AP proxy service discovery process, in accordance with example embodiments.

FIG. 11 is a flow diagram illustrating an AP proxy service discovery process, in accordance with example embodiments. As illustrated, the method 250 provides activities for an AP, such as device 14 of FIG. 1, acting as a proxy in a network. The method includes activities to send, at operation 252, proxy capabilities in a beacon or other broadcast message. When the AP receives at operation 254 a registration request from an SP, such as SP 16 of FIG. 1, the AP establishes security with the SP at operation 256. This may involve a negotiation between the AP and SP, and may be subject to timers to maintain the keys and artifacts of the security system.

The method 250 further includes activities for the AP to store a list of SP information in a memory storage unit at operation 258. At a later time, the AP receives a request for service information from a device, such as an SC, at operation 260. The AP then matches requested service information received from a potential service consumer to information stored in the memory storage unit at operation 262. The AP retrieves information as stored in the memory storage unit and, at operation 264, provides service information for the SPs registered with the AP. In one embodiment, the AP sends information related to the requested service, such as providing information about printers when an SC seeks to print a document.

Figure 12:
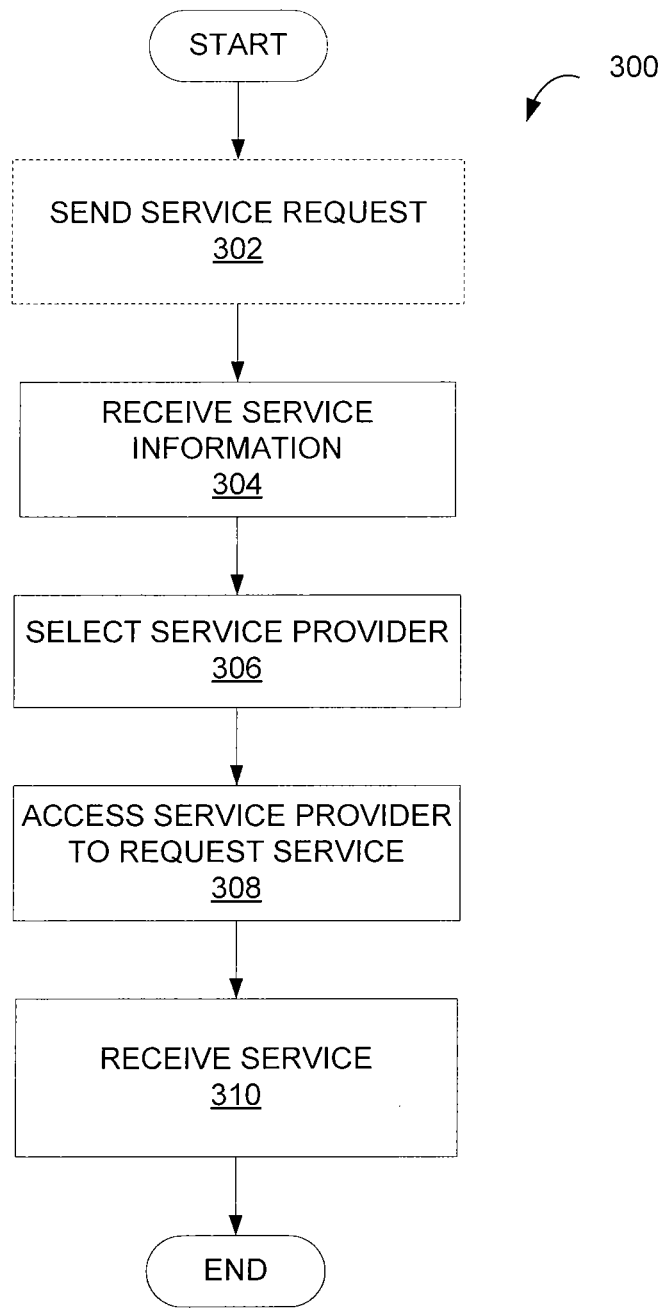
FIG. 12 is a flow diagram illustrating operations of a service consumer in a system supporting an AP proxy service discovery process, in accordance with example embodiments.

FIG. 12 is a flow diagram illustrating operations of a service consumer in a system supporting an AP proxy service discovery process, in accordance with example embodiment. As illustrated, a method 300 begins at operation 302 when a device, acting as a service consumer or potential service consumer, optionally sends a service request to an AP. The AP is acting as a proxy for a service provider. In one example, the device sends the service request as a probe request, such as illustrated in FIG. 10. The service request or probe request includes information as to the type of service requested. Similarly, the service request may include other information to identify the requested service.

In some examples, the AP provides a broadcast message or beacon to advertise the AP proxy service, which may include service provider information. Where the service provider information is transmitted as a broadcast message, service consumers receive the information and are able to access the service provider using the received information. In such a case, the service consumer does not necessarily send the service request to the AP.

Continuing with the method 300 of FIG. 12, at operation 304 the device receives the service information, such as information included in an IE provided by the AP. The service information may provide information for multiple service providers. At operation 306, the device may then select the service provider for the service. In some examples, the device may select multiple service providers for service. Similarly, the device may send an information service request to receive information as to the services available through the AP. The device may then decide on a service and a service provider. The device may decide on multiple services from multiple service providers. In an example embodiment, the device performs these operations automatically, such as where a report is scheduled for printing at a set time each week, and the device automatically seeks a printer close to the device for printing. In another example, a user of the device may provide instructions to perform an operation which includes accessing multiple services. In response, the device determines the services needed to perform the operation, identifies service providers, selects service providers and accesses the services at the service providers.

As illustrated in FIG. 12, at operation 306 the device selects a service provider, and then at operation 308 accesses the service provider to request the service. At operation 310, the device receives the service. Various implementations are considered, including an example allowing a vendor to optimize operations by caching SP information at an SC. In this example, the SC assumes the SP is valid unless an error is received. In another example, the SC uses a service discovery process each time a service is desired.

According to an example embodiment, a group owner may advertise device information for P2P clients within the group or currently associated with the group. In one example, the advertisement is referred to as a group information advertisement. In this way, if multiple devices are associated with or known to a group of devices, the information for the devices is known by the group owner, or a designated one of the devices. The group owner makes the information for the group available to others within the system 100 or through the system 100. The group information advertisement may be provided in a structure of a P2P group information sub-element. The group information advertisement allows another device to locate device information for other P2P groups or devices within a same group. The advertisements enable discovery of devices, such as P2P devices, which are known within system 100.

The group owner indicates its status as a member of a P2P group. For example, in FIG. 1, device 14 may be a group owner of group 11, and acts as AP for devices within group 11. This designation may be made by setting a bit in a field of an IE within a message frame, or may be made by sending a separate message to a node in the system 100. In one embodiment, the group indication is indicated by setting a bit as a group owner field in a P2P information sub-element included in a response frame, such as a beacon and probe response frame provided for both scanning for other devices and responding to scan requests received from other devices. Further, a device may provide additional information about the device in such messages and frames. For example, the device may further indicate whether additional connections are supported, such as in a group connection field in the P2P information sub-element.

Proxy AP service discovery may be used in coordination with other service discovery protocols, such as those done in different layers of the OSI model. For congested environments, such as for multiple networks or peer devices, the SC device may reduce the time for service discovery, providing an efficient use of a device.

In some examples, a device may narrow a service discovery scan phase to scan for a specific device type, rather than service type. In one embodiment a device discovery phase involves sending a query for a designated device type using a Wi-Fi Protected Set-up (WPS) IE as defined in Table II.

TABLE II

| WPS Information Element | |
| --- | --- |
| Attribute | WPS IE |
| Device Name | P2P Client only |
| Primary Device Type | P2P Client and Legacy WPS Client |

The WPS IE attribute for a requested device type may be similar to the format of other device type and may be included in the WPS IE of the probe request frame. A P2P group owner having a device type value identical to the requested device type value responds to the probe request frame with a probe response frame indicating that the device type is satisfied. When the probe request does not include a requested device type attribute in the WPS IE, then the group owner responds by providing all P2P devices in the probe response.

Figure 13:
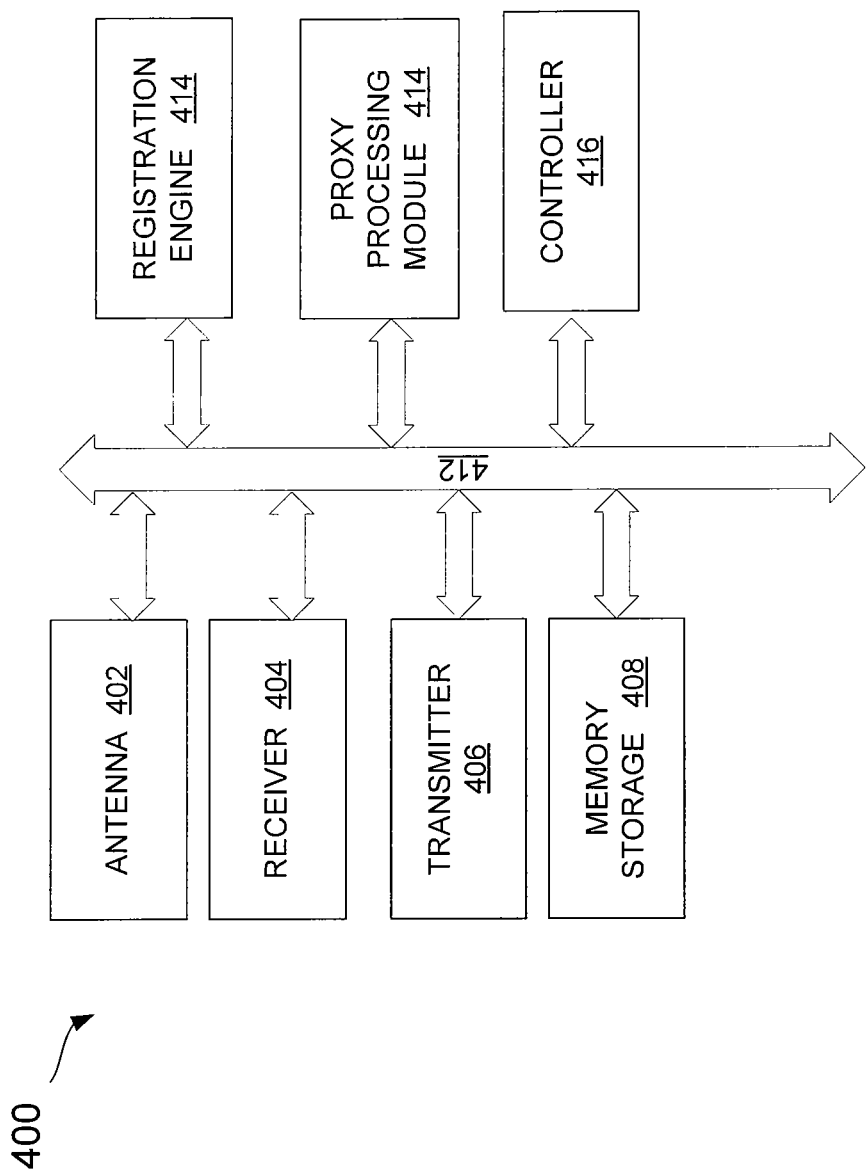
FIG. 13 is a computing system for implementing an AP proxy service discovery process, in accordance with example embodiments.

FIG. 13 is a computing system for implementing an AP proxy service discovery process, in accordance with example embodiments. The computing system 400 includes a receiver 404, a transmitter 406, an antenna 402 and memory storage 408. The receiver 404 and transmitter 406 may be a single transceiver unit for wireless communication. The computing system 400 may act as an AP, an SP or an SC. The computing system 400 further includes a registration engine 414 enabling the computing system 400 to act as an AP in receiving association and registration requests. A proxy processing module 414 enables operation as an AP, and a controller 416 provides control and enables operations within the computing system 400. A communication bus 412 enables communications for the various modules of the computing system 400.

In some embodiments, receiver 404 may be configured to receive Orthogonal Frequency-Division Multiplex (OFDM) communication signals over a multicarrier communication channel. The OFDM signals may comprise a plurality of orthogonal subcarriers. In some of these multicarrier embodiments, receiver 404 may be part of a Wireless Local Area Networks (WLANs) communication station such as a Wireless Access Point (WAP), base station or a mobile device including a Wireless-Fidelity (Wi-Fi) device. In some broadband multicarrier embodiments, a base station may be part of a Broadband Wireless Access (BWA) network communication station, such as a Worldwide Interoperability for Microwave Access (WiMAX) communication station. In some other broadband multicarrier embodiments, base stations and other network devices may be a 3rd Generation Partnership Project (3GPP), Universal Terrestrial Radio Access Network (UTRAN), or a Long-Term-Evolution (LTE) communication station, although the scope of the invention is not limited in this respect. In these broadband multicarrier embodiments, base stations and mobile stations may be configured to communicate in accordance with an OFDM Access (OFDMA) technique.

In some embodiments, receiver 404 may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as the systems, methods and apparatuses discussed herein may also be suitable to transmit and/or receive communications in accordance with other techniques and standards. In some embodiments, receiver 404 may be configured to receive signals in accordance with the IEEE 802.16-2004 and the IEEE 802.16(e) standards for Wireless Metropolitan Area Networks (WMANs), including variations and evolutions thereof, although the scope of the invention is not limited in this respect as the systems, methods and apparatuses discussed herein may also be suitable to transmit and/or receive communications in accordance with other techniques and standards. In some embodiments, receiver 404 may be configured to receive signals in accordance with the UTRAN LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005, and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, receiver 404 may be configured to receive signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

In some embodiments, receiver 404 may be part of a portable wireless communication device, such as a Personal Digital Assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antenna 402 may comprise one or more directional or omni-directional antennas, including, for example, dipole antennas, monopole antennas, patch antennas, loop antennas, micro-strip antennas or other types of antennas suitable for transmission of RF signals. In some embodiments, instead of two or more antennas, a single antenna with multiple apertures may be used. In these embodiments, each aperture may be considered a separate antenna. In some Multiple Input Multiple Output (MIMO) embodiments, antenna 402 may be effectively separated to take advantage of spatial diversity and the different channel characteristics that may result between each of antenna 402 and the antennas of a transmitting station. In some MIMO embodiments, antenna 402 may be separated by up to ¹⁄₁₀ of a wavelength or more.

In one embodiment, a method is performed by a processing unit for discovery in a wireless communication network. The method includes receiving a registration request from a service provider, storing a set of information for the service provider in a memory storage unit, and transmitting an indication of the service provider to at least one service consumer in the wireless communication network. The method may further include receiving a service request from a service consumer, the service request including requested service information and retrieving at least a portion of the set of information stored in the memory storage unit. Still further, the method may include sending a service response to the service consumer identifying the service provider, the service response including a plurality of information elements. In one embodiment, the method includes matching the requested service information to information stored in the memory storage unit, and retrieving the at least a portion of the set of information containing information matching the requested service information.

The service response may include a plurality of information elements, wherein an information element identifies one of: a type of service offered by the service provider, and access information for the service provider. A processing unit may be employed to receive a de-registration request from the service provider and to remove the set of information from the memory storage unit. Transmission of the indication is further to advertise the indication of the service provider to devices in the wireless communication network. Additionally, a processing unit may receive a probe request from a service consumer; and transmit the indication of the service provider as a probe response to the service consumer. Still further, the processing unit may transmit a proxy service capability to service providers in the wireless communication network. The wireless communication network may support Wi-Fi communication. The memory storage unit may store a plurality of sets of information corresponding to a plurality of service providers.

In some embodiments, a method in a wireless communication network includes sending a service request to a device, the device acting as a proxy for a plurality of service providers, receiving information for at least one of the plurality of service providers from the device, and accessing the at least one of the plurality of service providers using the information.

In one embodiment, an apparatus includes a communication module or transceiver to send and receive wireless communication signals within a wireless communication network, a proxy processing module to provide access point services within the wireless communication network and to receive service provider information from a plurality of service providers associated with the apparatus, and a memory storage unit to store the service provider information for the plurality of service providers, wherein the communication module is to transmit an indication of the service provider information to at least one service consumer in the wireless communication network. The apparatus may support a wireless communication protocol for Wi-Fi communications. The proxy processing module may transmit a proxy advertisement within the wireless communication network. The service provider information is received as an information element including a service provider identifier, a service type identifier, and access information for the service provider. The proxy processing module is further to transmit service provider information for a plurality of service providers within the wireless communication network. The proxy processing module is further to retrieve service provider information in response to a service request from a service consumer in the wireless communication network.

In some embodiments, a machine-readable medium is comprised of instructions, which when implemented by one or more machines, cause the one or more machines to receive a registration request from a service provider, store a set of information for the service provider in a memory storage unit, and transmit an indication of the service provider to at least one service consumer in the wireless communication network.

Unless specifically stated otherwise, terms such as "processing," "computing," "calculating," "determining," "displaying," or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software.

Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), Erasable Programmable Read-Only Memory (EPROM), Electrically Erasable Programmable Read-Only Memory (EEPROM), magnetic or optical cards, propagation media or other type of machine-readable media suitable for storing electronic instructions. For example, embodiments of the invention may be downloaded as a computer program, which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure, aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a wireless access point for service discovery in a wireless communication network, comprising:
   receiving a registration request from a service provider over the wireless communication network, the service provider having previously completed an association procedure with the wireless access point;
   determining whether the access point is capable of providing a proxy service for the service provider;
   storing a set of information for the service provider in a memory storage unit when there is capacity in the memory storage unit and the access point is capable of providing the proxy service;
   receiving a probe request message from a service consumer in the wireless communication network, the probe request message including a query element, the query element requesting service information from the wireless access point; and
   transmitting a probe response including at least a subset of the set of information for the service provider to the service consumer in the wireless communication network responsive to receiving the probe request.

2. The method of claim 1, wherein the association procedure is an association procedure in accordance with an IEEE 802.11 family of standards.

3. The method of claim 1, further comprising:
   transmitting the probe response including the at least a subset of the set of information for the service provider responsive to determining that the set of information matches requested service information of the probe request.

4. The method of claim 1, wherein the probe request and probe reply are Medium Access Control (MAC) messages in accordance with an Open Systems Interconnection reference model.

5. The method of claim 1, further comprising using the at least one processing unit to transmit a proxy service capability to service providers in the wireless communication network.

6. The method of claim 1, wherein the wireless access point operates in accordance with an IEEE 802.11 family of standards, and wherein the memory storage unit stores a plurality of sets of information corresponding to a plurality of service providers.

7. A method in a wireless communication network, comprising
   sending a probe request message to a wireless access point, the wireless access point acting as a proxy for a plurality of service providers who are associated with the wireless access point on the wireless communication network through a previous association process, the probe request message including a query element, the query element requesting service information from the wireless access point;
   receiving a probe response from the wireless access point over the wireless network, the probe response message including information for at least one of the plurality of service providers that was provided by the at least one of the plurality of service providers through a registration process completed with the wireless access point, the wireless access point determining whether there is capacity in a memory storage unit to store the information and a capability to provide a proxy service for the at least one of the plurality of service providers; and
   accessing the at least one of the plurality of service providers over the wireless communication network using the information.

8. The method of claim 7, wherein the probe request and the probe response messages are Medium Access Control (MAC) messages in accordance with an Open Systems Interconnection reference model.

9. The method as in claim 7, further comprising sending a registration request to the wireless access point to register as a service provider using a device as a proxy.

10. A wireless access point, comprising:
a communication module configured to send and receive wireless communication signals within a wireless communication network;
a proxy processing module configured to:
provide access point services within the wireless communication network;
receive service provider information from a plurality of service providers having previously completed an association procedure with the wireless access point;
determine whether the wireless access point is capable of providing a proxy service for the plurality of service providers; and
a memory storage unit to store the service provider information for the plurality of service providers when there is capacity in the memory storage unit and the wireless access point is capable of providing the proxy service,
wherein the communication module is configured to:
receive a probe request message from a service consumer in the wireless communication network, the probe request message including a query element, the query element requesting service information from the wireless access point; and
transmit a probe response including at least a subset of the service provider information to at least one service consumer in the wireless communication network.

11. The apparatus of claim 10, wherein the wireless access point operates in accordance with an IEEE 802.11 family of standards.

12. The apparatus of claim 10, wherein the proxy processing module is further to transmit a proxy advertisement within the wireless communication network.

13. The apparatus of claim 10, wherein the service provider information is received as an information element including a service provider identifier, a service type identifier, and access information for the service provider.

14. The apparatus of claim 10, wherein the proxy processing module is further configured to transmit service provider information for the plurality of service providers within the wireless communication network.

15. The apparatus of claim 10, wherein the probe request and the probe response messages are Medium Access Control (MAC) messages in accordance with an Open Systems Interconnection reference model.

16. A non-transitory machine-readable medium comprising instructions, which when implemented by one or more machines, cause the one or more machines to:
receive a registration request from a service provider at a wireless access point in a wireless communication network, the service provider having previously completed an association procedure with the wireless access point;
determine whether the access point is capable of providing a proxy service for the service provider;
store a set of information for the service provider in a memory storage unit when there is capacity in the memory storage unit and the wireless access point is capable of providing the proxy service;
receive a probe request message from a service consumer in the wireless communication network, the probe request message including a query element, the query element requesting service information from the wireless access point; and
transmit a probe response including at least a subset of the set of information for the service provider to the service consumer in the wireless communication network responsive to receiving the probe request.

17. The non-transitory machine-readable medium of claim 16, wherein the instructions, which when implemented by the one or more machines, cause the machines to transmit the probe response by transmitting an information element identifying one of: a type of service offered by the service provider; and access information for the service provider.

18. The non-transitory machine-readable medium of claim 16, wherein the instructions, which when implemented by the one or more machines cause the machine to:
receive a de-registration request from the service provider; and
remove the set of information from the memory storage unit.

* * * * *